UNITED STATES PATENT OFFICE.

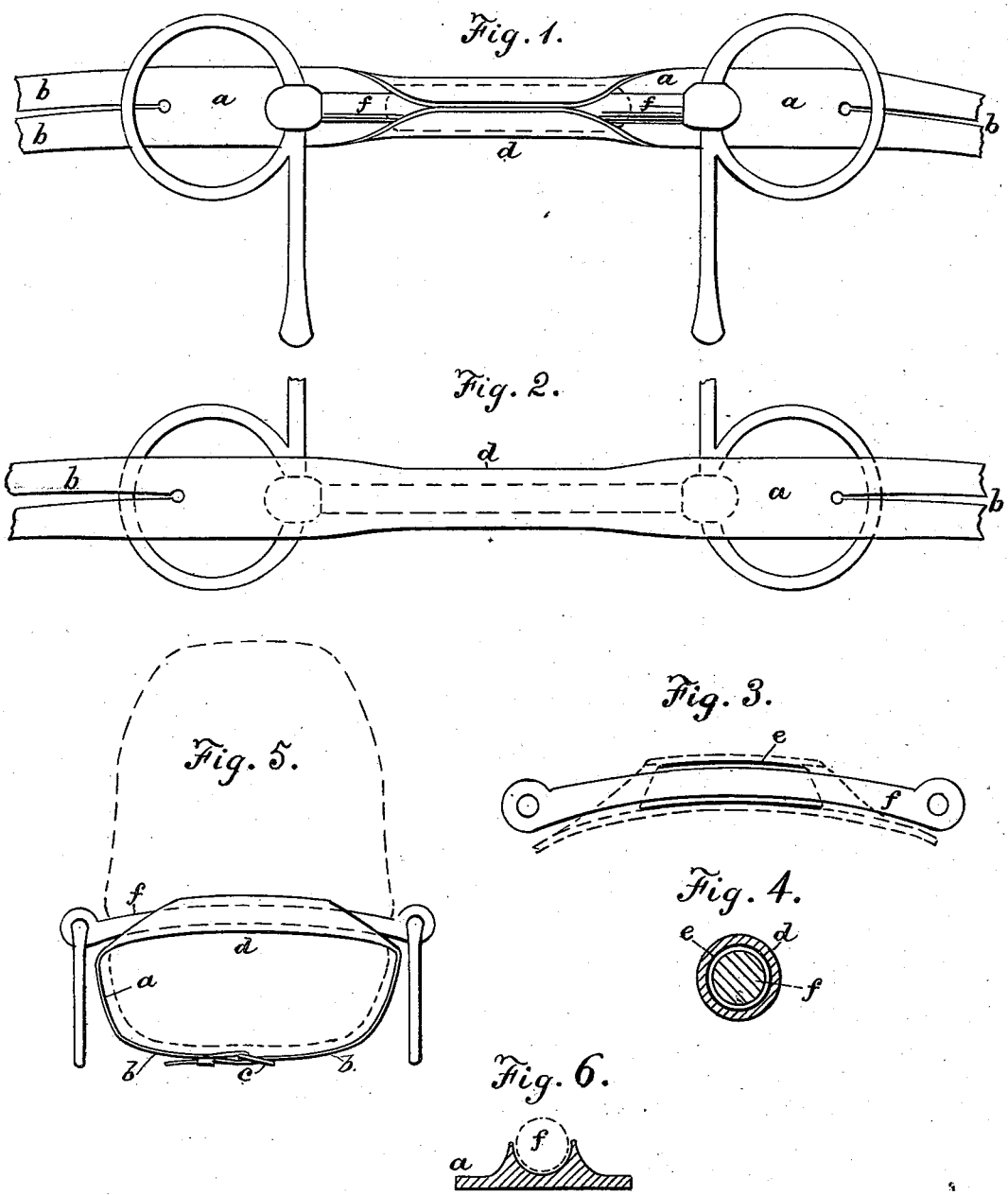

WILLIAMSON BRYDEN, OF CHELSEA, MASSACHUSETTS.

MOUTH-SHIELD FOR HORSES.

SPECIFICATION forming part of Letters Patent No. 230,401, dated July 27, 1880.

Application filed June 17, 1880. (Model.)

*To all whom it may concern:*

Be it known that I, WILLIAMSON BRYDEN, of the city of Chelsea, county of Suffolk, and State of Massachusetts, have invented a new and useful or Improved Mouth-Shield for Bridle-Horses, of which the following is a specification.

This invention relates to means for preventing the friction, abrasion, and consequent soreness resulting from the motion of the bit when in direct contact with the gums and lips of tender-mouthed horses and those that are restive under the restraint of the bit; and the invention consists in a shield formed of suitable material, and which may be either permanently attached to the bit or which is detachable therefrom when not in use, and when placed in the horse's mouth is secured by strings or by a strap and buckle fastened beneath the under jaw, as well as to the check-straps of the bridle if necessary, such shield being formed with a seat or bearing in which the mouth-bar of the bit is loosely seated, so that while the shield is fastened in the horse's mouth and does not move in relation thereto, yet the bit has a free rolling and sliding motion relatively to the shield without moving the same and without friction to the horse's mouth.

Figure 1 is a front elevation of a bit with my shield thereto applied. Fig. 2 is a view the reverse of Fig. 1, the mouth-bar being shown by dotted lines. Fig. 3 is a detached view, showing the mouth-bar and a thin metallic sleeve which is placed inside the shield when the latter is formed of leather or other soft material. Fig. 4 is a section taken transversely through the center of the mouth-bar, and showing said bar, the shield, and said interposed metallic sleeve, all in section. Fig. 5 is a top or plan view of the bit and shield as placed in the mouth of the horse, the jaws of the horse being indicated by dotted lines, as in transverse section. Fig. 6 is a section similar to Fig. 4, but showing the shield formed to allow its removal from the bit when not in use, it being formed with an open seat, in which the mouth-bar may be placed when the horse is bridled, and from which the bit may be removed before the shield is released from the horse's jaw.

Horses that have been for some time idle, and especially young and soft-mouthed horses and horses when being trained for races, are irritated and rendered fractious by the motion and friction of the bit upon the gums, particularly those in front of the first molars of the lower jaw, often causing serious injury to the horse's mouth (the gums and lips) by chafing and bruising the same, and sometimes even fracturing the bone of the lower jaw, such annoyance to the horse causing him to pull upon one rein and to resort to other vicious conduct; and it is to avoid these evils that I have invented my mouth-shield, which is formed with the body or main part $a$, having the extensions $b\ b$, by which to secure the shield in the horse's mouth by tying or buckling the same beneath the lower jaw, as shown at $c$, Fig. 5.

The central portion, $d$, may be curved into tube form around the mouth-bar $f$, as shown in Figs. 1, 4, 5, or it may be formed with a seat to receive the bar, as shown in Fig. 6.

This shield may be formed of rubber, leather, metal, or other suitable material, to adapt it to the sensitiveness and degree of softness of different horses' mouths, and when formed of leather, rubber, or other soft material the thin metallic sleeve $e$ may be secured in the middle portion of it to prevent the compression of the shield upon bar $f$ and the consequent obstruction to the free motion of said bar in the shield.

I am aware that a variety of inventions have been brought out having for their object the relief of horses' mouths from the friction resulting from the action of the bit therein, the same consisting in coverings of rubber, leather, and other materials, which were applied to the bits in a variety of ways; but my invention is distinguished from all such in that the shield not only protects the mouth from the action of the bit by furnishing a seat or bearing therefor, in which the mouth-bar freely moves by both a rolling and sliding motion, but the shield is provided with means whereby it is fastened to the jaw to prevent its moving with the bit.

The main or middle portion of the shield may be formed with an open seat, as shown in Fig. 6, in which case the bit and shield are not inseparably united; but the shield may be first secured in the horse's mouth and then the bit and bridle be thereto applied, while if formed as shown in Figs. 1, 4, 5 the shield and bit are placed in the mouth at the same time, after which the shield is fastened beneath the jaw.

In case of sore mouths, resulting from injury to the gums or jaw close to the front molars, rendering it necessary to apply the bit lower down in the mouth, the shield can be so formed that it will hold the bit in such position, and a greater purchase upon the jaw can be obtained by the same means.

I claim as my invention—

1. The mouth-shield $a$, formed to receive the bar $f$, and to serve as a bearing therefor, and provided with the extensions $b$, by which to secure it to the jaw to prevent its being moved thereon by the action of the bit, substantially as specified.

2. In combination with the flexible mouth-shield $a$, the metallic sleeve $e$, secured therein and adapted to receive loosely the mouth-bar $f$ of the bit, and to secure the shield from being compressed on said bar, substantially as specified.

WILLIAMSON BRYDEN.

Witnesses:
HENRY H. LETTENEY,
WM. H. ADAMS.